US012769780B2

(12) United States Patent
Kolugur et al.

(10) Patent No.: US 12,769,780 B2
(45) Date of Patent: Oct. 20, 2026

(54) MACHINE LEARNING-BASED MANAGEMENT OF FEEDBACK DATA

(71) Applicant: Dell Products L.P., Round Rock, TX (US)

(72) Inventors: Anil Kumar Kolugur, Durham, NC (US); Biraj Silwal, Pflugerville, TX (US); Songlin Hou, Worcester, MA (US); Neel Pravin Chaudhari, Castro Valley, CA (US); David C. Sydow, Merrimack, NH (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 18/618,448

(22) Filed: Mar. 27, 2024

(65) Prior Publication Data

US 2025/0307302 A1 Oct. 2, 2025

(51) Int. Cl.

*G06F 16/383* (2019.01)
*G06F 16/3329* (2025.01)
*G06F 16/334* (2025.01)

(52) U.S. Cl.

CPC ........ *G06F 16/383* (2019.01); *G06F 16/3329* (2019.01); *G06F 16/3347* (2019.01)

(58) Field of Classification Search

CPC . G06F 16/383; G06F 16/3329; G06F 16/3347
USPC ......................... 704/8–9, 202, 231–232, 251
See application file for complete search history.

(56) References Cited

U.S. PATENT DOCUMENTS

2020/0133641 A1 * 4/2020 Sinn ........................ G06F 9/453
2025/0261569 P1 * 8/2025 Schwartz ................ G06F 40/40

OTHER PUBLICATIONS

R. Merritt, "What is Retrieval-Augmented Generation, aka RAG?" https://blogs.nvidia.com/blog/what-is-retrieval-augmented-generation/, Nov. 15, 2023, 10 pages.
Dair.AI, "Retrieval Augmented Generation (RAG)," https://www.promptingguide.ai/techniques/rag, Accessed Mar. 27, 2024, 3 pages.
Wikipedia, "BERT (Language Model)," https://en.wikipedia.org/wiki/BERT_(language_model), Mar. 5, 2024, 6 pages.
Imperva, "Data Scraping," https://www.imperva.com/learn/application-security/data-scraping/, Accessed Mar. 27, 2024, 5 pages.
Wikipedia, "Data Scraping," https://en.wikipedia.org/wiki/Data_scraping, Mar. 20, 2024, 5 pages.

(Continued)

*Primary Examiner* — George C Monikang
(74) *Attorney, Agent, or Firm* — Ryan, Mason & Lewis, LLP

(57) ABSTRACT

An apparatus includes at least one processing device including a processor coupled to a memory, wherein the at least one processing device is configured to modify first data obtained from one or more sources, wherein the modifying includes adding user context data to the first data to generate second data, the second data representing the first data supplemented with a per-user context and, in response to receipt of a query, generate a response to the query using at least one generative language model supplemented by a retrieval augmented generation process based on at least a portion of the second data.

20 Claims, 7 Drawing Sheets

(56) References Cited

OTHER PUBLICATIONS

Amazon Web Services, "What are Large Language Models (LLM)?" https://aws.amazon.com/what-is/large-language-model/, Accessed Mar. 27, 2024, 8 pages.
Wikipedia, "Large Language Model," https://en.wikipedia.org/wiki/Large_language_model, Mar. 20, 2024, 24 pages.

* cited by examiner

320

| Contents | Metadata |
| --- | --- |
| I really like the speed of the new XYZ Array, it's much faster than my old array. | {user: u1, format: email} |
| XYZ Array | {user: u2, format: reddit post header} |
| Storage Admin here. Does anyone have experience with XYZ Array over other competitors? | {user: u2, format: reddit post content} |
| Based on my experience as a storage admin, I have to agree with you. | {user: u2, format: reddit comment} |
| The most important thing I look for when I buy new IT equipment for my business is a quick resolution to my problems when something does occur. | {user: u3, format: web forum comment} |

FIG. 3B

MACHINE LEARNING-BASED MANAGEMENT OF FEEDBACK DATA

FIELD

The field relates generally to information processing, and more particularly to managing information processing systems.

BACKGROUND

Enterprises, such as original equipment manufacturers (OEMs), typically strive to provide technical improvements in their products based on feedback from their customers. Many online forums exist that serve as platforms where customers relay their experiences with particular products of various OEMs. These discussions often offer valuable insights into product quality and potential missing or desired features. However, due to the dispersed nature of this data across the online forums, it tends to be a time-consuming and error-prone manual process of extracting insights. Further, live customer interactions are a valuable source of insights when developing new features and making decisions for building enterprise level software. Unfortunately, these opportunities are often limited due to customer availability and/or other technical obstacles.

SUMMARY

Illustrative embodiments provide techniques for machine learning-based management of feedback data. While particularly useful in the context of product feedback for enterprises, it is to be understood that machine learning-based management techniques described herein are not limited thereto.

In one illustrative embodiment, an apparatus includes at least one processing device including a processor coupled to a memory, wherein the at least one processing device is configured to modify first data obtained from one or more sources, wherein the modifying includes adding user context data to the first data to generate second data and the second data represents the first data supplemented with a per-user context and, in response to receipt of a query, to generate a response to the query using at least one generative language model supplemented by a retrieval augmented generation process based on at least a portion of the second data.

In some illustrative embodiments, the at least one generative language model includes a machine learning or artificial intelligence-based model such as a large language model. The first data may be feedback data in some illustrative embodiments.

These and other illustrative embodiments include, without limitation, methods, apparatus, networks, systems and processor-readable storage media.

BRIEF DESCRIPTION OF THE DRAWINGS

FIGS. 3A and 3B show further details of an architecture for an artificial intelligence-based feedback data management engine according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the terms “information processing system” and “information processing system environment” as used herein are intended to be broadly construed, so as to encompass, for example, processing systems comprising cloud computing and storage systems, as well as other types of processing systems comprising various combinations of physical and virtual processing resources. An information processing system environment may therefore include, for example, at least one data center, as well as a computing platform operatively coupled to the data center. For example, in some illustrative embodiments, an information processing system environment may include an enterprise computing environment (e.g., a computing platform) operatively coupled to a customer computing environment (e.g., a data center), wherein the customer computing environment includes one or more devices installed and/or supported by the enterprise.

It is realized herein that it is a technical challenge for an enterprise (e.g., an OEM) to extract insights from various sources with respect to previously deployed products due to the dispersed nature of this feedback data, as well as other technical obstacles. It is further realized herein that it would be desirable to have the ability to combine feedback and/or other data on potential new product features and existing issues, and provide access to the data in an easy-to-use medium since this could significantly benefit, for example, individuals and/or systems responsible for developing and engineering new enterprise product features.

Illustrative embodiments address these and other technical issues by providing artificial intelligence (AI)-based feedback data management functionalities as will be illustrative explained below in the context of the figures. The term “AI-based” as illustratively used herein with respect to models and agent modules can refer to artificial intelligence, machine learning, deep learning, and the like.

Figure 1:
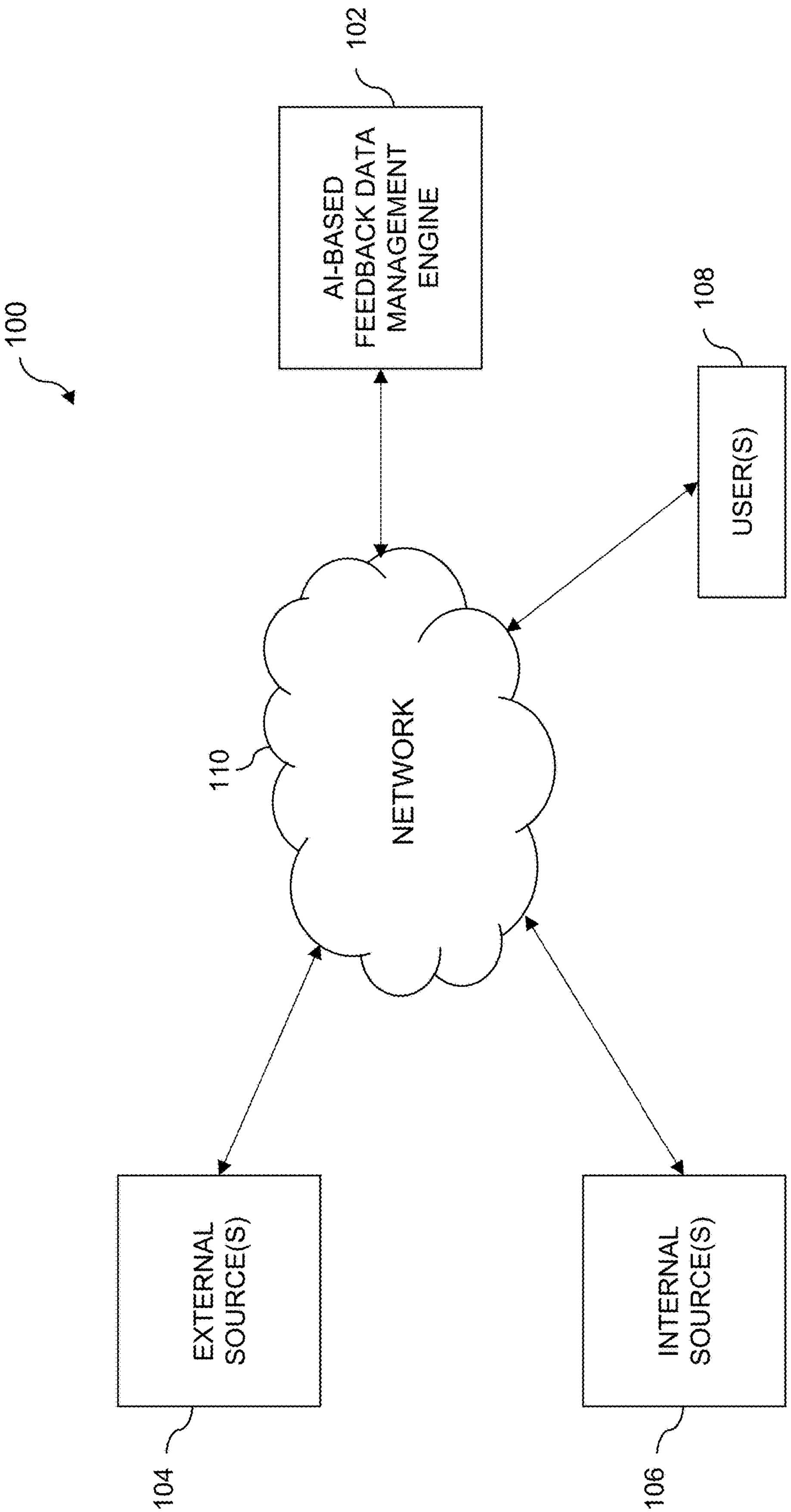
FIG. 1 shows an information processing system environment with artificial intelligence-based feedback data management functionalities according to an illustrative embodiment.

Referring initially to FIG. 1, an information processing system environment 100 with AI-based feedback data management functionalities according to an illustrative embodiment is depicted. More specifically, as shown, information processing system environment 100 includes an AI-based feedback data management engine 102 operatively coupled to one or more external sources 104, one or more internal sources 106, and one or more users 108 via a network 110. Network 110 may include one or more data communication networks such as, but not limited to, the internet, a telecommunication network, an edge computing network, a cloud computing network, a private enterprise network, and any combinations thereof. The terms internal and external are intended to be considered from a perspective of the enterprise for which AI-based feedback data management engine 102 is implemented. One or more users 108 can include users internal to the enterprise (e.g., employees, managers, product developers, engineers, etc.), as well as external to the enterprise (e.g., customers, product development partners, vendors, etc.). One or more users 108 are also understood to include one or more computer systems.

Figure 2:
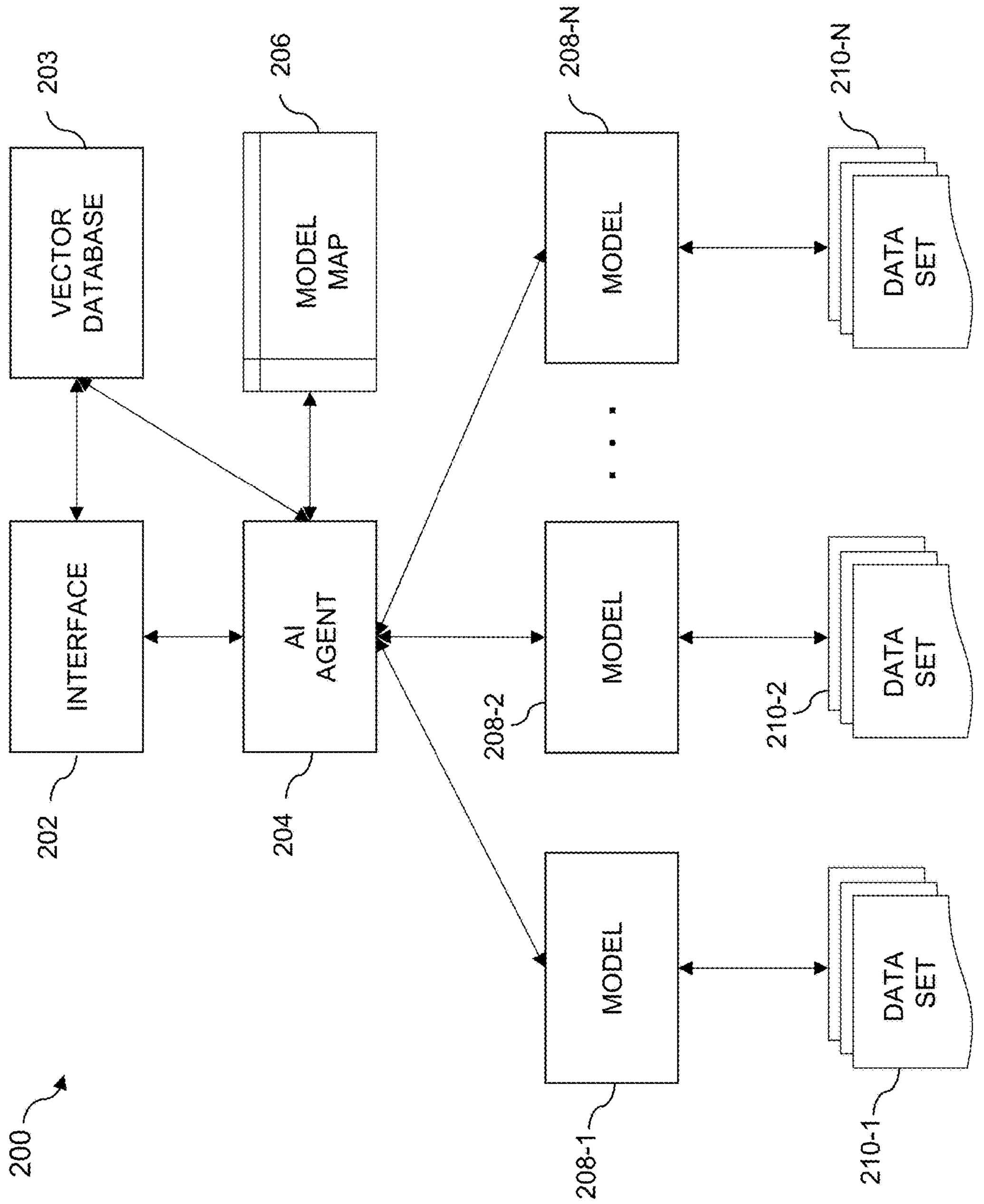
FIG. 2 shows an architecture for an artificial intelligence-based feedback data management engine according to an illustrative embodiment.
Figure 3A:
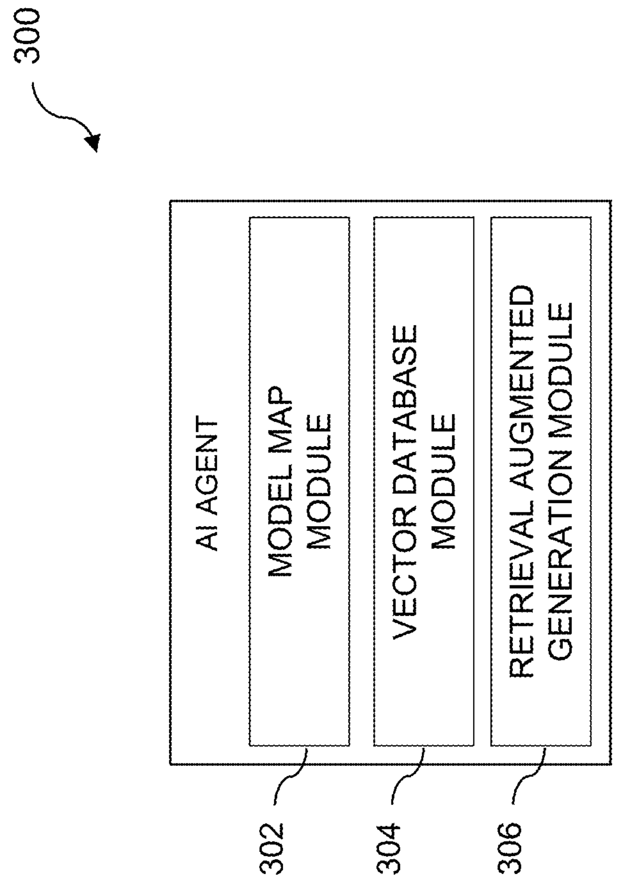
Figure 4:
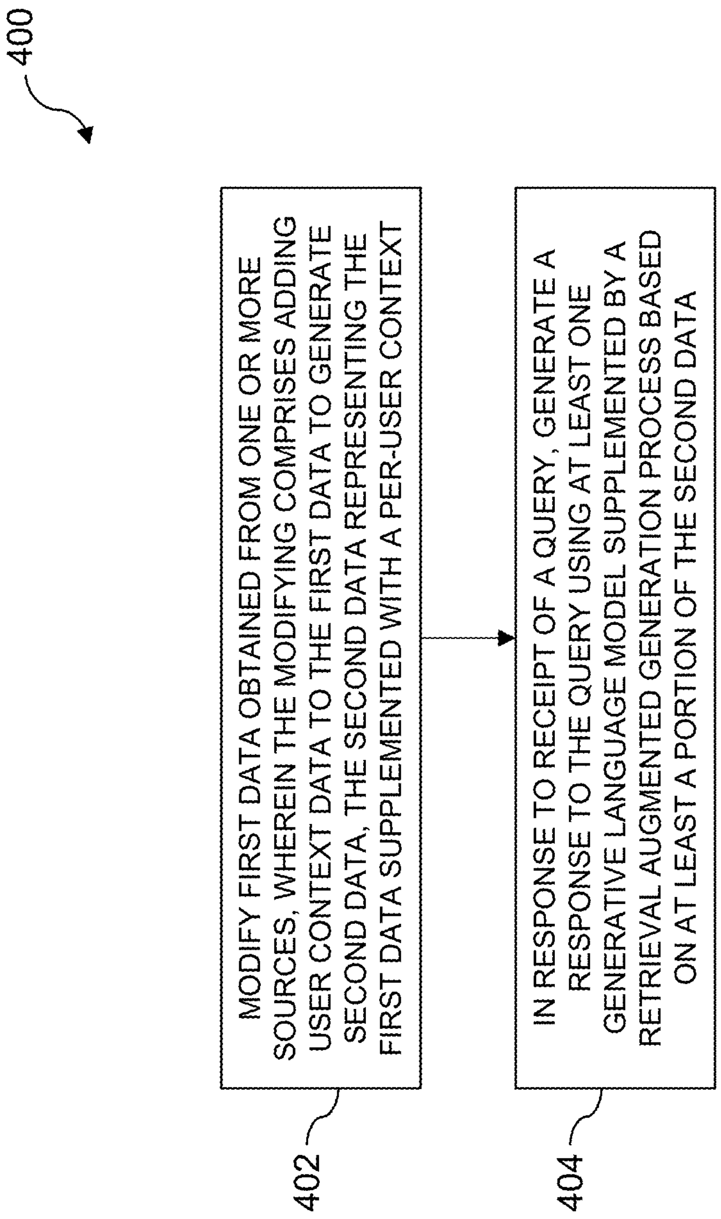
FIG. 4 shows an artificial intelligence-based feedback data management methodology according to an illustrative embodiment.

As will be further described herein in the context of FIGS. 2-4, in one or illustrative embodiments, AI-based feedback data management engine 102 is configured to include, or otherwise access, one or more large language models (LLMs) configured to generate virtual feedback profiles by using raw digital signatures (e.g., source data) obtained from various sources, e.g., one or more external sources 104 and one or more internal sources 106. In a non-limiting OEM/enterprise use case, such sources may include, but are not limited to: (i) internal enterprise communications and other internal data sources (e.g., emails, documentation, etc.); (ii) external websites (e.g., Spiceworks, etc.); (iii) external social media platforms (e.g., Reddit, LinkedIn, Twitter, etc.); and/or (iv) other internal and/or external data sources from which useful insights may be obtained. Further, an AI-based agent in AI-based feedback data management engine 102 is configured to use some or all of the source data to generate custom vectorized data specific to one or more parameters (e.g., job and technology information) and then use the custom vectorized data to supplement searching for insights.

FIG. 2 shows an architecture 200 for an artificial intelligence-based feedback data management engine according to an illustrative embodiment. For example, architecture 200 can be considered an illustrative embodiment of AI-based feedback data management engine 102 of FIG. 1. As shown, architecture 200 includes an interface 202, a vector database 203, an AI agent 204, a model map 206, a plurality of models 208-1, 208-2, . . . , 208-N (hereinafter referred to collectively as models 208 and individually as model 208), and a plurality of data sets 210-1, 210-2, . . . , 210-N (hereinafter referred to collectively as data sets 210 and individually as data set 210) respectively corresponding to the plurality of models 208-1, 208-2, . . . , 208-N. In illustrative embodiments, one or more of models 208 include one or more LLMs.

AI agent 204, as mentioned and as will be described in further detail, generates custom vectorized data, to supplement previously obtained vectorized data, to better enable responses to queries received from one or more users (e.g., one or more users 108 of FIG. 1) searching for insights about some subject of interest (e.g., product feedback). More particularly, AI agent 204 is configured to generate one or more virtual feedback profiles using, at least in part, the custom vectorized data.

FIG. 3A depicts an architecture 300 as an example of AI agent 204 according to an illustrative embodiment. Architecture 300 of AI agent 204 (also referred to herein as AI agent 300) includes a model map module 302, a vector database module 304, and a retrieval augmented generation (RAG) module 306. While illustratively depicted as separate modules, it is to be understood that functionalities of the modules 302, 304, and 306 can be combined in one or more modules in alternative embodiments. Also, AI agent functionalities, other than those illustrated in FIG. 3A, can be implemented in one or more other modules (not expressly shown) and/or in one or more of the modules 302, 304, and 306 shown in FIG. 3A.

Functionalities and interrelationship of each of the components depicted in FIGS. 2, 3A and 3B will now be described in accordance with a non-limiting OEM/enterprise use case.

In some illustrative embodiments, interface 202 (FIG. 2) can include a web-based user interface that facilitates text-based inputs by users (e.g., one or more users 108 of FIG. 1) and can be a custom-built webpage and chatbot, a pre-existing commercial off the shelf commodity that integrates chat capabilities, or some combination thereof.

For example, upon receiving a text-based user command, interface 202 passes text from the user to AI agent 204, either via a REST-based protocol when a custom chatbot is built, or via a proprietary protocol when using a commercial off the shelf commodity chatbot. Responses from AI agent 204 are then sent to interface 202 and presented to the appropriate user.

Interface 202, in some illustrative embodiments, is also configured to provide data scraping functionality, although in alternative embodiments, AI agent 204 can perform some or all of the data scraping functionality. A data scraping process is used to collect information that will be used by AI agent 204 to build virtual feedback profiles. A goal of the data scraping process is to gather and organize the data in such a way that AI agent 204 can use retrieval augmented generation (RAG), as will be described in further detail below, to create realistic virtual feedback profiles.

As mentioned above, data can be collected from various sources (e.g., external source(s) 104, internal source(s) 106). In the non-limiting OEM/enterprise use case, such sources can include, but are not limited to, internal emails, external websites (e.g., Spiceworks), and/or social media platforms (e.g., Reddit, LinkedIn, Twitter, etc.).

After the data is collected, in some illustrative embodiments, the data is encoded and stored such that the data is accessible on a per-user basis. At least a portion of the resulting content will be used to form individual virtual feedback profiles. Data that is scraped from social platforms can be encoded into vectors using a conventional vectorizer, e.g., the data is vectorized. For example, encoding can be performed using an OpenAI application programming interface (API), or a custom transformer model such as a Bidirectional Encoder Representations from Transformers (BERT) model. In some illustrative embodiments, vectorization of the data for each of the different types of data sources, e.g., internal emails, external websites, and social media platforms, can be performed in the following manner.

For vectorization of internal emails, the contents of each email is transformed into a single vector. The title of each email is also transformed into a single vector. Further, attachments are decoded and transformed into a single vector. By way of example only, reading and vectorization for attachments such as Word, PDF, PowerPoint, etc. can be done using open-source software such as LangChain. Metadata indicative of the email sender, e.g., username, is associated with the contents, comments, and attachment vectors in a vector database. Such a vector database can be referred to herein as a vector database, e.g., vector database 203.

For vectorization of external web forum data, the contents of each post is transformed into a single vector. The title of each post is also transformed into a single vector. Further, the contents of each reply comment is transformed into a single vector. Metadata indicative of the web forum data creator, e.g., username, is associated with the contents, posts, and title vectors in vector database 203.

For vectorization of social media platform data, the contents of each post is transformed into a single vector. The title of each post is also transformed into a single vector. Further, the contents of each reply comment is transformed into a single vector. Metadata indicative of the social media post creator, e.g., username, is associated with the contents, comments, and title vectors in vector database 203.

FIG. 3B illustrates an example of a part of vector database 203 (e.g., showing contents, e.g., emails, posts, etc.) as a table 320. Note that table 320 illustrates the vector data as if the data is stored in text form since vector embeddings would not necessarily illustrate the example concept as well. However, in one or more illustrative embodiments, a vector database can store data as text and/or as vector embeddings. Vector embeddings are a mechanism to convert words, sentences and other data into a numerical representation that captures the meaning and relationships between the words, sentences and other data. Note in table 320 that a username or other user identifier (e.g., u1, u2, etc.) of the creator/sender is associated with their corresponding contents in a relational database row. It is to be understood, however, that other mechanisms for associating content and content source in a data storage structure may be implemented in alternative embodiments.

Referring further now to AI agent 204 of FIG. 2 (e.g., AI agent 300 of FIG. 3A), AI agent 204 takes requests from a user and utilizes retrieval augmented generation or RAG techniques to find and build appropriate virtual feedback profiles. RAG improves the capabilities of LLMs by incorporating an external data retrieval step into the LLM generative process. This approach allows one or more LLMs (e.g., one or more of models 208) to dynamically fetch relevant information from a vast corpus of data (e.g., one or more data sets 210 and/or data in vector database 203 as will be further explained), including user-specific data sets, enriching its responses with accurate, up-to-date, and context-specific content. RAG enhances the utility and effectiveness of chatbots by enabling them to access and use external knowledge bases, making them more informative and versatile. A fundamental concept of RAG lies in its ability to connect the LLM's general knowledge and the user's specific data. For instance, a user can import a collection of PDFs containing domain-specific knowledge into a database that the LLM can understand. The LLM can then leverage this domain-specific knowledge to generate responses that are not only based on its inherent general understanding but also tailored to the user's specific dataset.

In some embodiments, AI agent 204 is, itself, an LLM (e.g., Llama or OpenAI). While implementing AI agent 204 as an LLM can increase completeness and accuracy of results (e.g., based on the number of neurons of the LLM), use of a specific LLM, or an LLM at all, is not necessary for AI agent 204 to provide advantages described herein. That is, whether or not AI agent 300 is implemented as an LLM or not, AI agent 204 is configured to create a custom vector database that supports RAG-based answering capability to simulate a virtual feedback profile (e.g., virtual customer) and retrieval and creation of context.

As an initial step, AI agent 204 is configured to build a model map 206 (e.g., via model map module 302). Model map 206 contains a link between the data gathered in the data scraping and vectorization steps performed by interface 202 (or AI agent 204) and stored in the vector database 203 (e.g., accessible via vector database module 304), and the subset of data that will be fed into the RAG process (e.g., performed by RAG module 306). Model map module 302 augments information in vector database 203, via vector database module 304, which will be populated with custom metadata and information created in accordance with RAG module 306.

More particularly, in one or more illustrative embodiments, AI agent 204 performs the following steps to generate content of the vector database 203:

1. AI agent 204 creates a set of queries that are used (by AI agent 204) to retrieve data from vector database 203, with the data filtered for each unique metadata value (see, e.g., metadata values in table 320). In some illustrative embodiments, queries can be as follows:
   a. What technologies are the user familiar with?
   b. What type of job does the user have?
   c. Based on the technologies you are familiar with in {technologies step a}, what is your opinion of each of the technologies?
2. For each query from the prior step, AI agent 204 performs a similarity search on vector database 203 to generate responses to each of these questions, based on data of each individual user collected in vector database 203.
3. The responses to each of these questions are then added back into vector database 203, with the following metadata added to the answer:
   a. Question asked;
   b. Username; and
   c. AI agent datatype Once the model map 206 is built, AI agent 204 now has access to information on a per-user basis, along with some salient queries that it can use to help search the information. AI agent 204 has a set of raw data to use as responses, as well as the answers stored into model map 206 that have been generated by the AI agent 204.

Advantageously, using AI agent 204 to build context for RAG increases the accuracy of its responses by creating an appropriate context. Without such context, the AI agent 204 would not be able to answer the specific questions that customers may ask because they may not have been trained into the LLMs and their data sets, e.g., models 208 and data sets 210. Conversely, creating a context that is too broad can also decrease accuracy of answers as the context can confuse the LLMs with too much information.

Once a user question is asked, AI agent 204 performs a series of tasks to retrieve the appropriate context to be used for its RAG-based answer:

1. AI agent 204 generates queries using the user question as context:
   a. What technology is this question asking about?
   b. What type of job would require someone to know about the technology in {question a}?
2. AI agent 204 uses the responses from the previous step to search the supplemented vector database 203, e.g., using the query:
   a. Find information about {technologies from 1.a} or someone who has worked in {job from 1.b}.
3. AI agent 204 will take the data and metadata from step 2.a and strip the corresponding username from vector database 203.
4. AI agent 204 generates a context from vector database 203 that is based only on the username retrieved in step 3.
   a. The context contains the original post/comment/content history drawn from vector database 203.
5. AI agent 204 uses a template to answer user questions as shown in the example interaction below.

Example Interaction:

The following is an example template that AI agent 204 can use to answer a question provided by the user. The template is a default template created for AI agent 204, the context is retrieved by the AI agent 204 from vector database 203, and the question is supplied by the user (e.g., one or more users 108) through interface 202. Note that the example here is related to discussions about features of storage arrays (e.g., array upgrade parameters, array rebuild parameters) from two different storage array OEMs, e.g., ABC and XYZ.

Template (Used by AI Agent 204):

Answer the following question as if you are a person and I am asking you the question: {question} "how long are you willing to wait for a RAID6 rebuild." Base your answer on the following text: {context}.

Context (Retrieved from Vector Database 203):

"Thanks for the info, we do not plan to take any array product upgrades. We really do not plan to need any controller replacement until end-of-life, which would be in 8 years for the array from ABC. Not sure about the end-of-life for the XYZ array. If we pay for ABC's upgrade, we will have paid for a whole unit with the extra cost. ABC was talking about ≤10 minutes rebuild. 180 minutes is still good, with RAID6.

"We bought our first SAN from XYZ in 2011, support was great, performance was not perfect (hybrid with a small amount of SSD). Then we replaced it in 2017 by the all-flash from XYZ. Never had a disk-related performance issue since. Had a few controller reboots, solved by firmware upgrade but otherwise it is good."

Question (provided by a user, e.g., an OEM user such as a product developer, engineer, manager, etc.):

"How long are you willing to wait for a RAID6 rebuild?"

AI agent 204 answer:

"I would say I am willing to wait for a RAID6 rebuild for up to 180 minutes. It seems like a reasonable trade-off given the context. The mention of ABC boasting a rebuild time of less than 10 minutes is impressive, but considering the cost implications of options like XYZ's upgrade or, a 180-minute rebuild time with RAID6 is acceptable to me. The plan to avoid controller replacement until the end-of-life, which is around 8 years, also supports this willingness to wait for a slightly longer rebuild time."

The AI agent 204 answer is considered as being created by a virtual feedback profile (e.g., simulating a virtual customer), which in some embodiments is at least one of the models (LLMs) 208 trained on the per-user context used to augment (modify) the initially-created vector database 203. Advantageously, in the OEM/enterprise use case, the virtual feedback profile is created using raw digital signatures (raw vectorized data) from various sources including, but not limited to, internal company emails, external websites, and/or social media platforms. More particularly, the AI agent 204 is configured to use raw digital signatures to create custom vectorized data specific to job and technology information and use that data to supplement searching so that RAG techniques can be used to generate an appropriate answer.

FIG. 4 shows an artificial intelligence-based feedback data management methodology (e.g., a methodology 400) according to an illustrative embodiment. As shown in methodology 400, step 402 modifies first data obtained from one or more sources, wherein the modifying includes adding user context data to the first data to generate second data, the second data representing the first data supplemented with a per-user context. Step 404, in response to receipt of a query, generates a response to the query using at least one generative language model supplemented by a retrieval augmented generation process based on at least a portion of the second data.

In some examples, the modifying (e.g., step 402) further includes generating a mapping between the first data (e.g., raw vectorized data) and the second data (e.g., custom vectorized data), wherein the mapping includes links between the first data and the second data.

In some examples, the user context data further includes one or more parameters attributable to one or more users such that the first data is supplemented based on the one or more parameters to form a per-user context in the second data. In some further examples, the one or more parameters attributable to one or more users include one or more of a user familiarity (e.g., technology familiarity, job or position, etc.) with one or more subjects associated with the first data. The user context data may further include one or more identifiers (e.g., usernames, IDs, etc.) of one or more users.

In some examples, the at least one generative language model includes a large language model (e.g., LLM) such that the generating of the response to the query further includes generating a virtual feedback profile (e.g., a virtual customer) based the large language model trained on at least a portion of the second data.

In some examples, the generating of the response to the query (e.g., step 404) further includes translating the query into a prompt for the large language model.

In some examples, the first data may be obtained from the one or more sources using a data scraping process.

In some examples, the one or more sources of the first data include one or more of external data and internal data with respect to a given entity (e.g., OEM/enterprise) associated with managing the processing device.

Advantageously, illustrative embodiments provide technical solutions to create one or more virtual customers (e.g., a network of virtual customers) that are made accessible to individuals within an enterprise. In some illustrative technical solutions, the main components include: communication via a user interface, data scraping, an AI agent that facilitates the interaction between the user and models (LLMs) by translating user commands into LLM prompts, and creation of virtual feedback profiles (virtual customers) represented by custom trained LLMs. It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement artificial intelligence-based feedback data management functionalities will now be described in greater detail with reference to FIGS. 5 and 6. Although described in the context of information processing system environment 100 (e.g., including architectures 200 and 300, and methodology 400), these platforms may also be used to implement at least portions of other information processing systems in other embodiments.

Figure 5:
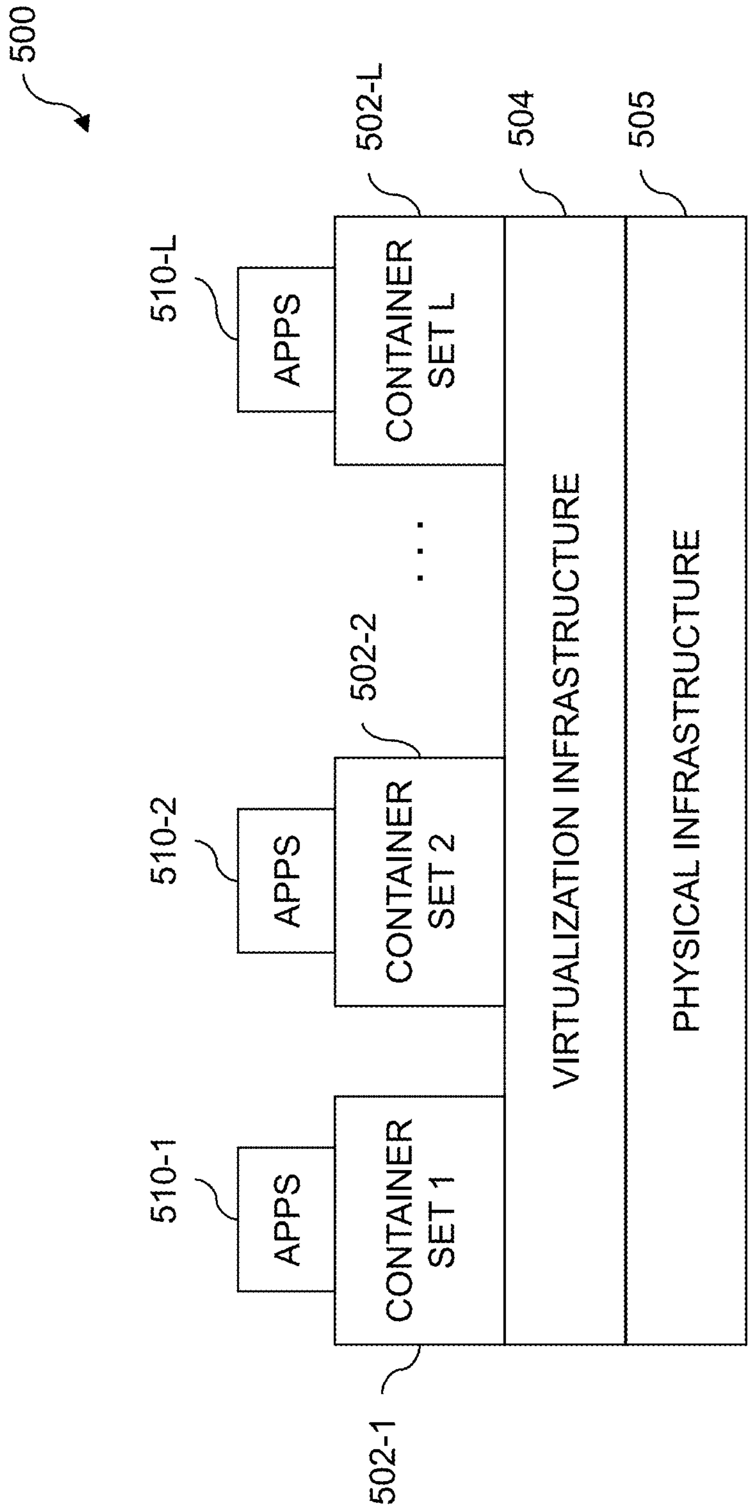
FIGS. 5 and 6 show examples of processing platforms that may be utilized to implement at least a portion of an information processing system in illustrative embodiments.
Figure 6:
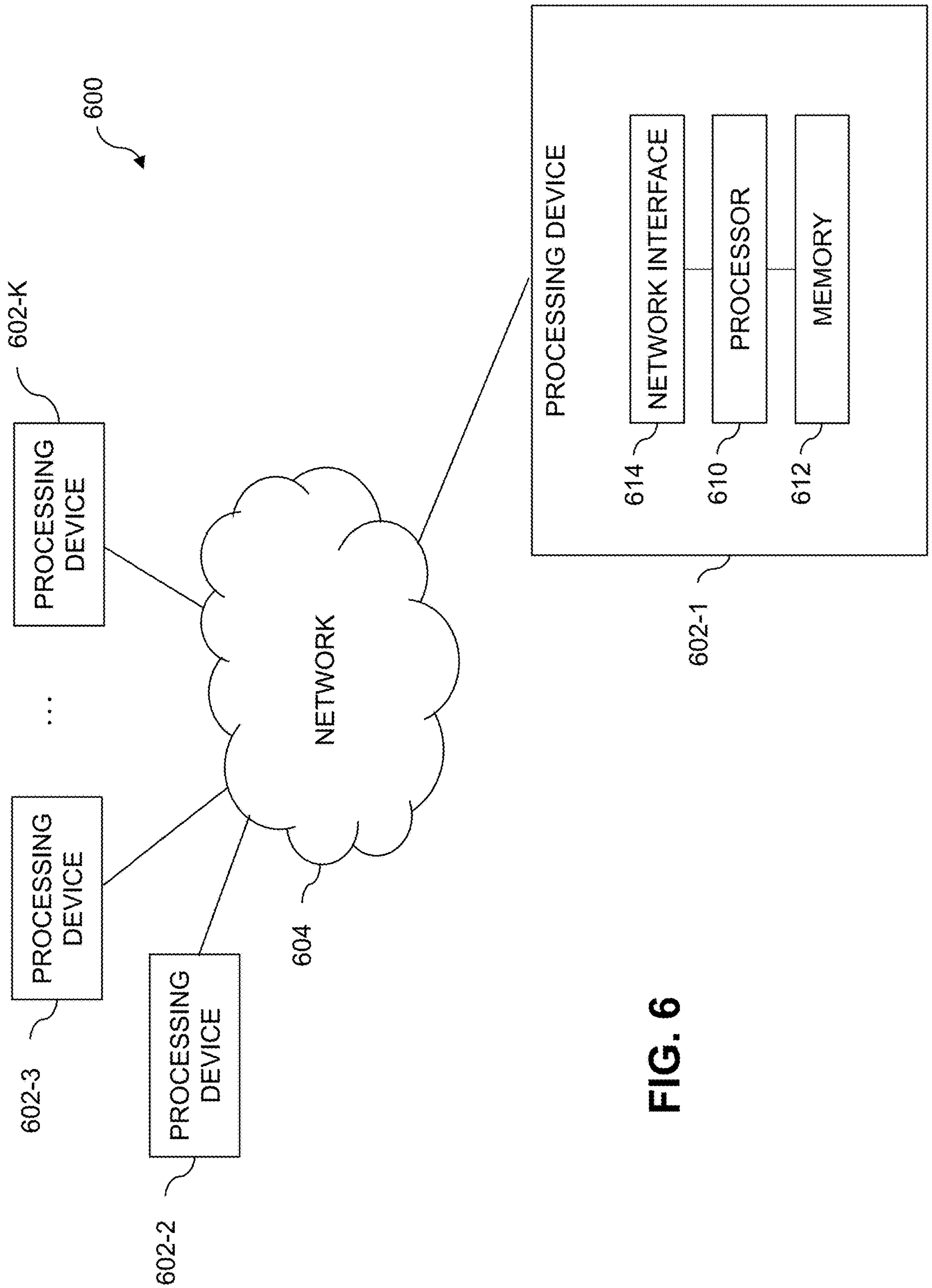

FIG. 5 shows an example processing platform comprising cloud infrastructure 500. The cloud infrastructure 500 includes a combination of physical and virtual processing resources that may be utilized to implement at least a portion of the information processing system environment 100 in FIG. 1. The cloud infrastructure 500 includes multiple virtual machines (VMs) and/or container sets 502-1, 502-2, . . . 502-L implemented using virtualization infrastructure 504. The virtualization infrastructure 504 runs on physical infrastructure 505, and illustratively includes one or more hypervisors and/or operating system level virtualization infrastructure. The operating system level virtualization infrastructure illustratively includes kernel control groups of a Linux operating system or other type of operating system.

The cloud infrastructure 500 further includes sets of applications 510-1, 510-2, . . . 510-L running on respective ones of the VMs/container sets 502-1, 502-2, . . . 502-L under the control of the virtualization infrastructure 504. The VMs/container sets 502 may include respective VMs, respective sets of one or more containers, or respective sets of one or more containers running in VMs.

In some implementations of the FIG. 5 embodiment, the VMs/container sets 502 include respective VMs implemented using virtualization infrastructure 504 that includes at least one hypervisor. A hypervisor platform may be used to implement a hypervisor within the virtualization infrastructure 504, where the hypervisor platform has an associated virtual infrastructure management system. The underlying physical machines may include one or more distributed processing platforms that include one or more storage systems.

In other implementations of the FIG. 5 embodiment, the VMs/container sets 502 include respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment includes a portion of information processing system environment 100 and includes a plurality of processing devices, denoted 602-1, 602-2, 602-3, . . . 602-K, which communicate with one another over a network 604.

The network 604 may include any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 includes a processor 610 coupled to a memory 612.

The processor 610 may include a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may include random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may include, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may include conventional transceivers.

The other processing devices 602 of the processing platform 600 are assumed to be configured in a manner similar to that shown for processing device 602-1 in the figure.

Again, the particular processing platform 600 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can include converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionalities described herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, chassis configurations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory, the at least one processing device being configured to:

modify first data obtained from one or more sources, wherein the modifying comprises adding user context data to the first data to generate second data, the second data representing the first data supplemented with a per-user context, wherein the user context data further comprises one or more identifiers of one or more users;

generate one or more virtual user feedback profiles based on at least a portion of the second data, wherein the one or more virtual user feedback profiles simulate one or more virtual users of at least one item used by the one or more users; and in response to receipt of a query, generate a response to the query using at least one generative language model supplemented by a retrieval augmented generation process based on at least a portion of the one or more virtual user feedback profiles.

2. The apparatus of claim 1, wherein the modifying further comprises generating a mapping between the first data and the second data, wherein the mapping comprises links between the first data and the second data.

3. The apparatus of claim 1, wherein the user context data further comprises one or more parameters attributable to one or more users such that the first data is supplemented based on the one or more parameters to form the per-user context in the second data.

4. The apparatus of claim 3, wherein the one or more parameters attributable to the one or more users comprise a user familiarity with one or more subjects associated with the first data.

5. The apparatus of claim 1, wherein the at least one generative language model comprises a large language model.

6. The apparatus of claim 5, wherein the generating of the response to the query further comprises translating the query into a prompt for the large language model.

7. The apparatus of claim 1, wherein the first data is obtained from the one or more sources using a data scraping process.

8. The apparatus of claim 1, wherein the one or more sources of the first data comprise one or more of external data and internal data with respect to a given entity associated with managing the processing device.

9. A computer program product comprising a non-transitory processor-readable storage medium having stored therein program code of one or more software programs, wherein the program code when executed by at least one processing device causes the at least one processing device to:

modify first data obtained from one or more sources, wherein the modifying comprises adding user context data to the first data to generate second data, the second data representing the first data supplemented with a per-user context, wherein the user context data further comprises one or more identifiers of one or more users;

generate one or more virtual user feedback profiles based on at least a portion of the second data, wherein the one or more virtual user feedback profiles simulate one or more virtual users of at least one item used by the one or more users; and in response to receipt of a query, generate a response to the query using at least one generative language model supplemented by a retrieval augmented generation process based on at least a portion of the one or more virtual user feedback profiles.

10. The computer program product of claim 9, wherein the modifying further comprises generating a mapping between the first data and the second data, wherein the mapping comprises links between the first data and the second data.

11. The computer program product of claim 9, wherein the user context data further comprises one or more parameters attributable to one or more users such that the first data is supplemented based on the one or more parameters to form the per-user context in the second data.

12. The computer program product of claim 11, wherein the one or more parameters attributable to one or more users comprise a user familiarity with one or more subjects associated with the first data.

13. The computer program product of claim 9, wherein the at least one generative language model comprises a large language model.

14. The computer program product of claim 13, wherein the generating of the response to the query further comprises translating the query into a prompt for the large language model.

15. The computer program product of claim 9, wherein the first data is obtained from the one or more sources using a data scraping process, and wherein the one or more sources of the first data comprise one or more of external data and internal data with respect to a given entity associated with managing the processing device.

16. A method comprising:

modifying first data obtained from one or more sources, wherein the modifying comprises adding user context data to the first data to generate second data, the second data representing the first data supplemented with a per-user context, wherein the user context data further comprises one or more identifiers of one or more users;

generating one or more virtual user feedback profiles based on at least a portion of the second data, wherein the one or more virtual user feedback profiles simulate one or more virtual users of at least one item used by the one or more users; and in response to receipt of a query, generating a response to the query using at least one generative language model supplemented by a retrieval augmented generation process based on at least a portion of the one or more virtual user feedback profiles;

wherein the method is performed by at least one processing device comprising a processor coupled to a memory.

17. The method of claim 16, wherein the modifying further comprises generating a mapping between the first data and the second data, wherein the mapping comprises links between the first data and the second data.

18. The method of claim 16, wherein the user context data further comprises one or more parameters attributable to one or more users such that the first data is supplemented based on the one or more parameters to form the per-user context in the second data.

19. The method of claim 18, wherein the one or more parameters attributable to the one or more users comprise a user familiarity with one or more subjects associated with the first data.

20. The method of claim 16, wherein the at least one generative language model comprises a large language model.

* * * * *